United States Patent
Adachi

(10) Patent No.: US 11,141,862 B2
(45) Date of Patent: Oct. 12, 2021

(54) CONTROL APPARATUS, ROBOT SYSTEM AND CONTROL METHOD

(71) Applicant: Seiko Epson Corporation, Tokyo (JP)

(72) Inventor: Hiroki Adachi, Matsumoto (JP)

(73) Assignee: Seiko Epson Corporation

( * ) Notice: Subject to any disclaimer, the term of this patent is extended or adjusted under 35 U.S.C. 154(b) by 133 days.

(21) Appl. No.: 16/426,158

(22) Filed: May 30, 2019

(65) Prior Publication Data
US 2019/0366549 A1 Dec. 5, 2019

(30) Foreign Application Priority Data

May 31, 2018 (JP) .............................. JP2018-104489

(51) Int. Cl.
*B25J 9/16* (2006.01)
*B25J 9/02* (2006.01)
*B25J 13/08* (2006.01)

(52) U.S. Cl.
CPC ............. *B25J 9/1694* (2013.01); *B25J 9/023* (2013.01); *B25J 13/085* (2013.01)

(58) Field of Classification Search
CPC ........ B25J 9/1694; B25J 9/023; B25J 13/085; B25J 9/1633; B25J 13/00; G05B 2219/39445; G05B 2219/40087; G05B 2219/39483; G05B 2219/39209; G05B 2219/36433; G05B 19/423
USPC ................................................. 700/245, 258
See application file for complete search history.

(56) References Cited

U.S. PATENT DOCUMENTS

| | | | | |
|---|---|---|---|---|
| 5,608,618 A | * | 3/1997 | Kosaka | G05B 19/425 318/568.19 |
| 5,748,854 A | * | 5/1998 | Watanabe | G05B 19/423 318/568.16 |
| 6,553,652 B2 | * | 4/2003 | Sakakibara | B25J 9/1633 29/709 |
| 9,199,375 B2 | * | 12/2015 | Miyoshi | B25J 9/1612 |
| 10,144,125 B2 | * | 12/2018 | Su | G05B 19/425 |
| 10,350,768 B2 | * | 7/2019 | Takeuchi | G05B 19/423 |
| 10,434,646 B2 | * | 10/2019 | Takeuchi | B25J 9/1633 |

(Continued)

FOREIGN PATENT DOCUMENTS

JP H11-231925 A 8/1999

OTHER PUBLICATIONS

Extended European Search Report for Application No. EP 19 17 7269 dated Oct. 8, 2019 (8 pages).

*Primary Examiner* — Jaime Figueroa
(74) *Attorney, Agent, or Firm* — Harness, Dickey & Pierce, P.L.C.

(57) ABSTRACT

A control apparatus includes a processor that is configured to control a robot, and receive an object coordinate system set for an object not an end effector and not moving or rotating with the end effector. The processor is configured to execute a first control mode in which the end effector is moved and rotated according to a detected force while the force is detected by a force detector, and execute a second control mode in which, when a relative angle between a predetermined first axis of a moving coordinate system moving and rotating with the end effector and a predetermined second axis of the object coordinate system is smaller than an angle threshold value, the end effector is rotated to make magnitude of the relative angle closer to zero.

9 Claims, 10 Drawing Sheets

(56) References Cited

U.S. PATENT DOCUMENTS

| | | | |
|---|---|---|---|
| 2004/0078114 A1* | 4/2004 | Cordell | G05B 19/425 |
| | | | 700/258 |
| 2004/0257021 A1* | 12/2004 | Chang | G05B 19/427 |
| | | | 318/568.21 |
| 2008/0312769 A1* | 12/2008 | Sato | B25J 9/1687 |
| | | | 700/249 |
| 2011/0218676 A1* | 9/2011 | Okazaki | B25J 9/1633 |
| | | | 700/260 |
| 2011/0313573 A1* | 12/2011 | Schreiber | B25J 9/1656 |
| | | | 700/275 |
| 2012/0130541 A1* | 5/2012 | Szalek | B25J 13/085 |
| | | | 700/258 |
| 2012/0253514 A1* | 10/2012 | Sugimoto | G05B 13/0265 |
| | | | 700/250 |
| 2014/0324218 A1* | 10/2014 | Suzuki | B25J 13/082 |
| | | | 700/258 |
| 2016/0100899 A1* | 4/2016 | Jinno | A61B 34/37 |
| | | | 606/130 |
| 2017/0259431 A1 | 9/2017 | Takeuchi | |
| 2017/0266815 A1 | 9/2017 | Takeuchi | |
| 2018/0043525 A1 | 2/2018 | Su et al. | |

* cited by examiner

CONTROL APPARATUS, ROBOT SYSTEM AND CONTROL METHOD

The present application is based on, and claims priority from JP Application Serial Number 2018-104489, filed May 31, 2018, the disclosure of which is hereby incorporated by reference herein in its entirety.

BACKGROUND

1. Technical Field

The present disclosure relates to teaching of a robot for performing force control.

2. Related Art

In a robot disclosed in JP-A-11-231925, a user performs teaching on the robot by applying an external force to fingers of the robot to move and rotate the fingers of the robot. In the technique, for example, when work of inserting a second object into a hole having a predetermined depth provided in a first object is taught to the robot, it is desired that the direction of the fingers of the robot holding the second object is accurately aligned with the direction of the hole depth of the first object.

JP-A-11-231925 is an example of the related art.

However, in the teaching of the robot, it is not easy to accurately align the direction of the fingers of the robot with a desired direction.

SUMMARY

According to an aspect of the present disclosure, a control apparatus that controls a robot including a movable unit and a force detection unit detecting a force applied to the movable unit is provided. The control apparatus includes a control unit that executes control of the robot, and a receiving unit that receives an object coordinate system set for an object from a user. The control unit has a first control mode in which the movable unit is moved and rotated according to the force detected by the force detection unit while the force is detected by the force detection unit, and a second control mode in which, when a relative angle between a predetermined first axis of a moving coordinate system set for the movable unit and a predetermined second axis of the object coordinate system is smaller than an angle threshold value in the control in the first control mode, the movable unit is rotated to make magnitude of the relative angle closer to zero under a predetermined condition.

DESCRIPTION OF EXEMPLARY EMBODIMENTS

A. First Embodiment

Figure 1:
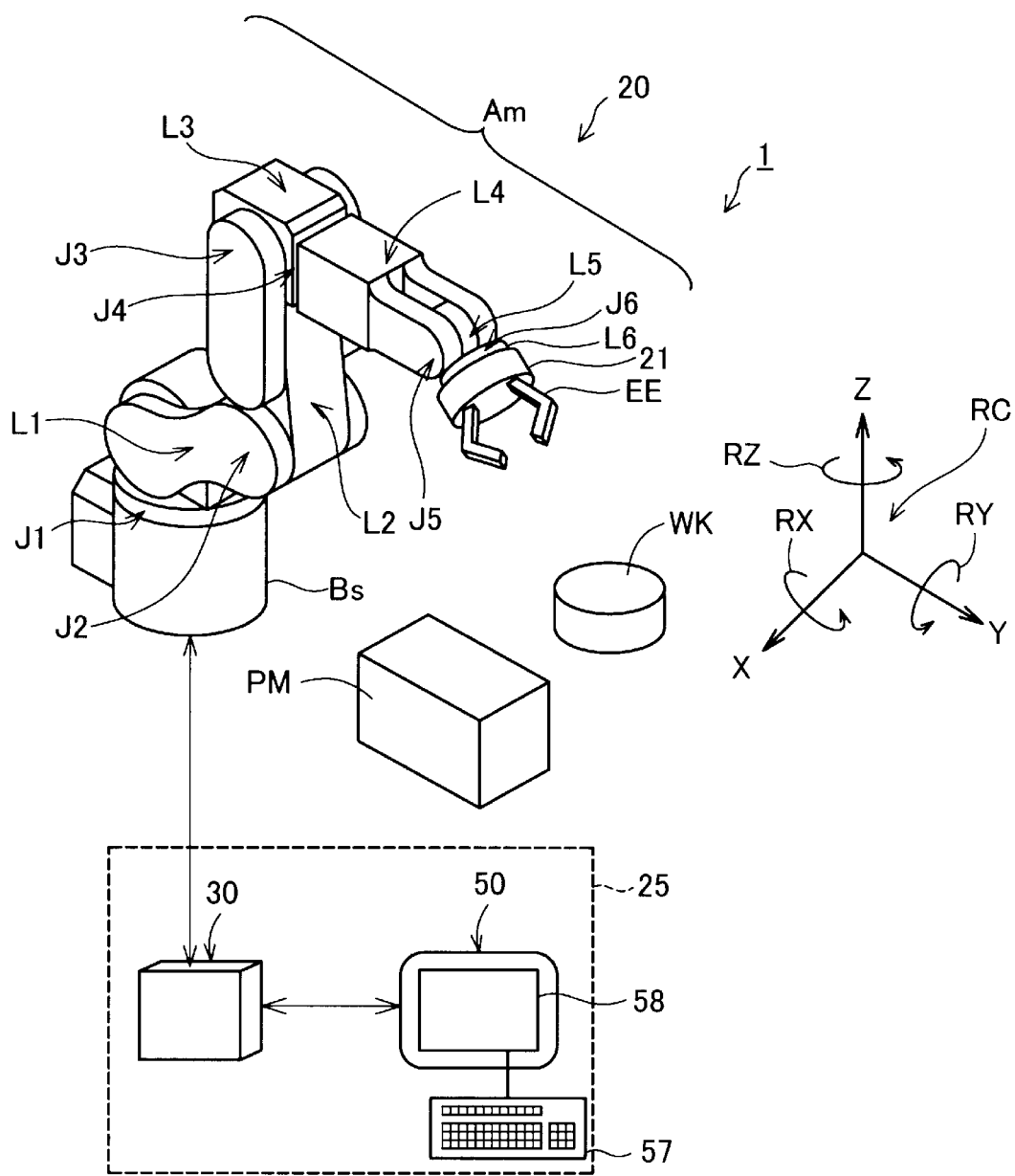
FIG. 1 shows a hardware configuration of a robot system according to an embodiment.

A1. Configuration of Robot System:

FIG. 1 shows the hardware configuration of the robot system 1 according to the embodiment. The robot system 1 performs predetermined processing on a work WK in cooperation with a processing apparatus PM. The robot system 1 includes a robot 20 and the robot control apparatus 25. The robot control apparatus 25 controls the robot 20. The robot control apparatus 25 includes an operation control apparatus 30 and the teaching apparatus 50.

The robot 20 is a single-arm robot having an arm Am and a support Bs that supports the arm Am. The arm Am is a six-axis vertical articulated arm. The arm Am includes links L1 to L6 as six arm members and joints J1 to J6 as six joints. The joint J2, joint J3, and joint J5 are bending joints and the joint J1, joint J4, and joint J6 are twisting joints.

The support Bs and the link L1 are coupled via the joint J1. The link L1 and the link L2 are coupled via the joint J2. The link L2 and the link L3 are coupled via the joint J3. The link L3 and the link L4 are coupled via the joint J4. The link L4 and the link L5 are coupled via the joint J5. The link L5, the link L6, a force detection unit (a force detector) 21 and an end effector EE are coupled via the joint J6. The force detection unit 21 is attached to the link L6.

The end effector EE is attached to the distal end of the arm Am via the force detection unit 21. The end effector EE is a device for gripping the work WK as an object to be processed by the robot 20. The position of the end effector EE is provided by a TCP (Tool Center Point). In the embodiment, the TCP is on the rotation axis of the joint J6. The operation control apparatus 30 drives the arm Am, and thereby, controls the position of the TCP as a control point in the robot coordinate system RC.

The force detection unit 21 is a six-axis force sensor that can detect magnitude of an externally applied force. The force detection unit 21 detects magnitude of forces on three detection axes orthogonal to one another and magnitude of torque about those three detection axes.

In the embodiment, with reference to the position of the support Bs, the coordinate system defining the space in which the robot 20 is installed is expressed by the robot coordinate system RC. The robot coordinate system RC is a three-dimensional orthogonal coordinate system defined by an X-axis and a Y-axis orthogonal to each other on the horizontal plane and a Z-axis in an upward vertical direction as a positive direction. In this specification, the X-axis in the robot coordinate system RC is simply referred to as "X-axis". The Y-axis in the robot coordinate system RC is simply referred to as "Y-axis". The Z-axis in the robot coordinate system RC is simply referred to as "Z-axis". An arbitrary position in the robot coordinate system RC may be specified by a position DX in the X-axis direction, a position DY in the Y-axis direction, and a position DZ in the Z-axis direction.

In the embodiment, an arbitrary posture in the robot coordinate system RC may be expressed by an angular position RX about the X-axis, an angular position RY about the Y-axis, and an angular position RZ about the Z-axis.

In this specification, the word "position" means not only a position in a narrow sense but also a posture. The word "force" may mean not only a force defined by a direction and magnitude in the three-dimensional space in a narrow sense but also torque acting in the respective rotation directions in the angular position RX, the angular position RY, and the angular position RZ.

The arm Am, the force detection unit 21, and the end effector EE are communicably connected to the operation control apparatus 30 of the robot control apparatus 25 by cables.

Figure 2:
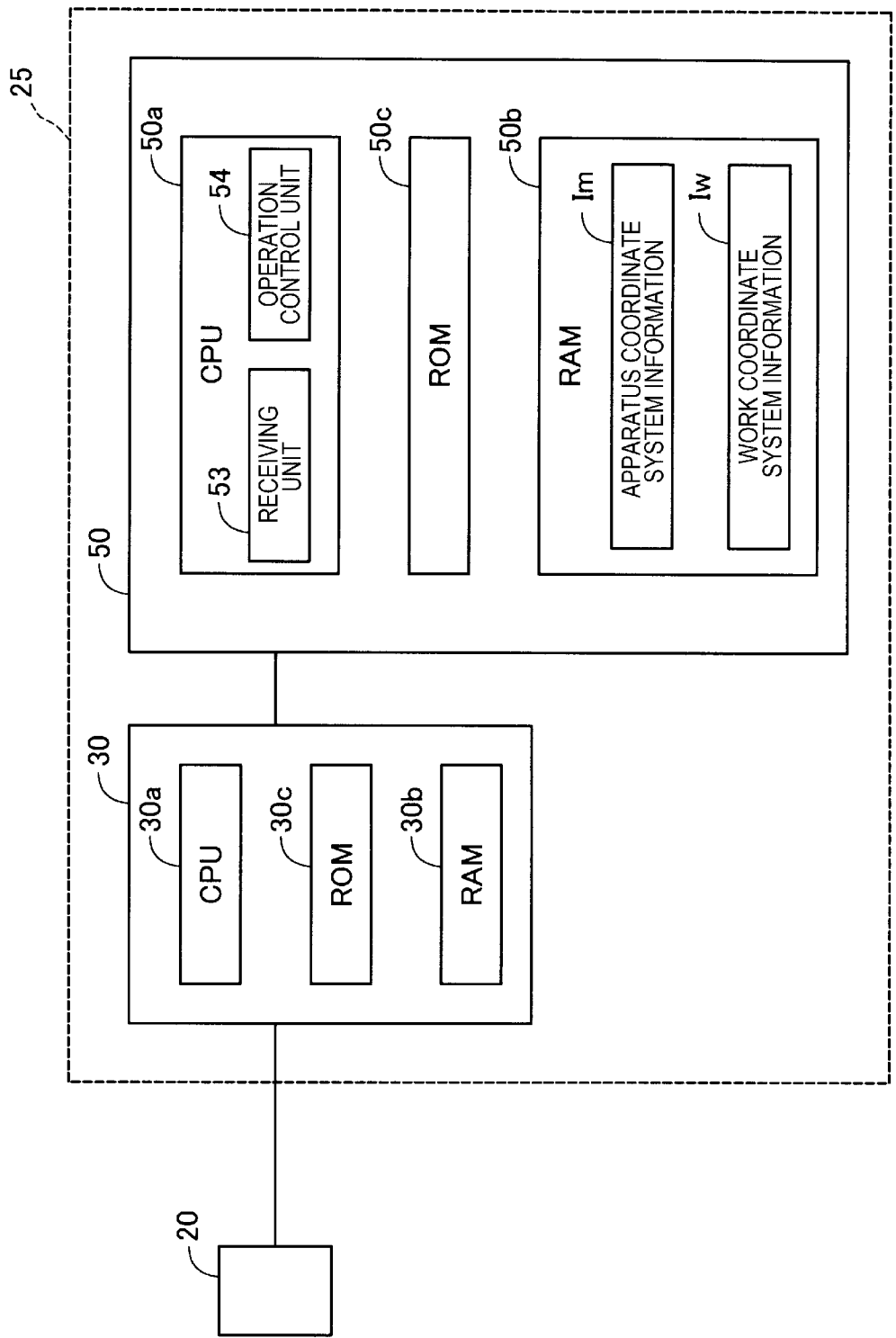
FIG. 2 is a block diagram of a robot control apparatus.

FIG. 2 is the block diagram of the robot control apparatus 25. The robot control apparatus 25 includes the operation control apparatus 30 and the teaching apparatus 50. The operation control apparatus 30 controls the arm A of the robot 20 for realizing a target force in a target position set in teaching work by a user. The operation control apparatus 30 includes a CPU (Central Processing Unit) 30a as a processor, a RAM (Random Access Memory) 30b, and a ROM (Read-Only Memory) 30c. In the operation control apparatus 30, control programs for controlling the robot 20 are installed. In the operation control apparatus 30, these hardware resources and control programs cooperatively operate.

The teaching apparatus 50 teaches a target position St and a target force fst to the operation control apparatus 30. The teaching apparatus 50 includes a CPU 50a, a RAM 50b, a ROM 50c, etc. In the teaching apparatus 50, teaching programs for teaching the target position St and the target force fst to the operation control apparatus 30 are installed. In the teaching apparatus 50, these hardware resources and teaching programs cooperatively operate.

As shown in FIG. 1, the teaching apparatus 50 further includes an input device 57 and an output device 58. The input device 57 includes e.g. a mouse, keyboard, touch panel, etc. and receives instructions from the user. The output device 58 includes e.g. a display, speaker, etc. and outputs various kinds of information to the user.

Figure 3:
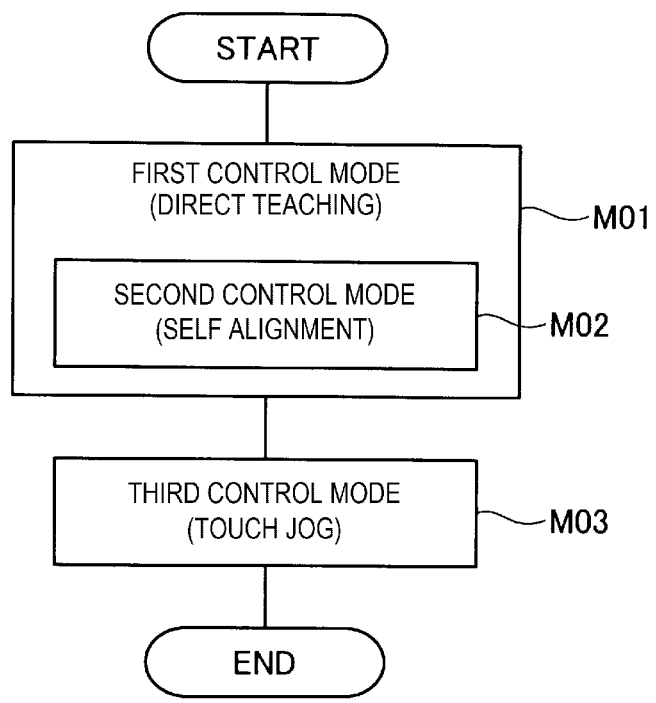
FIG. 3 is a flowchart showing an operation mode for teaching a position of a control point to the robot system via a teaching apparatus.

A2. Operation Modes of Robot System:

FIG. 3 is the flowchart showing the operation mode for teaching the position of the control point to the robot system 1 via the teaching apparatus 50. The control point is the TCP in the embodiment.

The teaching apparatus 50 first operates the robot 20 in a first control mode M01 and teaches the position of the control point to the robot system 1. The first control mode M01 is a control mode in which the end effector EE is moved and rotated according to a detected force while the force is detected by the force detection unit 21. In the first control mode M01, the so-called "direct teaching" is performed. In the first control mode M01, the user moves the end effector EE with a hand and places the end effector EE in a desired position at a desired angle within the three-dimensional space. Note that, in the first control mode M01, the user is not strictly able to place the end effector EE in the desired position at the desired angle.

While the robot 20 is operated in the first control mode M01, when a certain condition is fulfilled, the teaching apparatus 50 operates the robot 20 in a second control mode M02. The second control mode M02 is a control mode in which the so-called "automatic alignment" is performed. According to the second control mode M02, the user may place the end effector EE at an angle closer to the desired angle compared to the first control mode M01. The details of control in the second control mode M02 will be described later. After the angle of the end effector EE is adjusted in the second control mode M02, the user may adjust the position by moving the end effector EE with the hand.

In the first control mode M01 and the second control mode M02, the end effector EE is substantially placed in the desired position at the desired angle of the user, and then, the teaching apparatus 50 operates the robot 20 in a third control mode M03. The third control mode M03 is a control mode in which the end effector EE is moved or rotated in a predetermined direction in a predetermined amount according to a direction of a detected force independent of the time in which the force is detected, when the force is detected by the force detection unit 21. In the third control mode M03, the so-called "touch jog" is performed.

In the third control mode M03, when the detected force is a force to move the end effector EE in a certain direction, a direction closest to the direction of the detected force is determined among a positive direction along the X-axis, a negative direction along the X-axis, a positive direction along the Y-axis, a negative direction along the Y-axis, a positive direction along the Z-axis, and a negative direction along the Z-axis. Then, the end effector EE is moved in the determined direction in a predetermined amount. The amount of movement may be set to e.g. 0.1 mm.

In the third control mode M03, when the detected force is a rotational force to rotate the end effector EE in a certain direction, a rotation direction closest to the direction of the rotation of the detected rotational force is determined among the forward rotation direction around the X-axis, the backward rotation direction around the X-axis, the forward rotation direction around the Y-axis, the backward rotation direction around the Y-axis, the forward rotation direction around the Z-axis, and the backward rotation direction around the Z-axis. Then, the end effector EE is rotated in the determined rotation direction to a predetermined rotation angle. The rotation angle may be set to e.g. 0.5 degrees.

In the third control mode, the user may place the end effector EE at a position and an angle closer to the desired angle compared to the first control mode M01. Note that, in the control in the third control mode M03, the shift to the second control mode M02 is not made.

Figure 4:
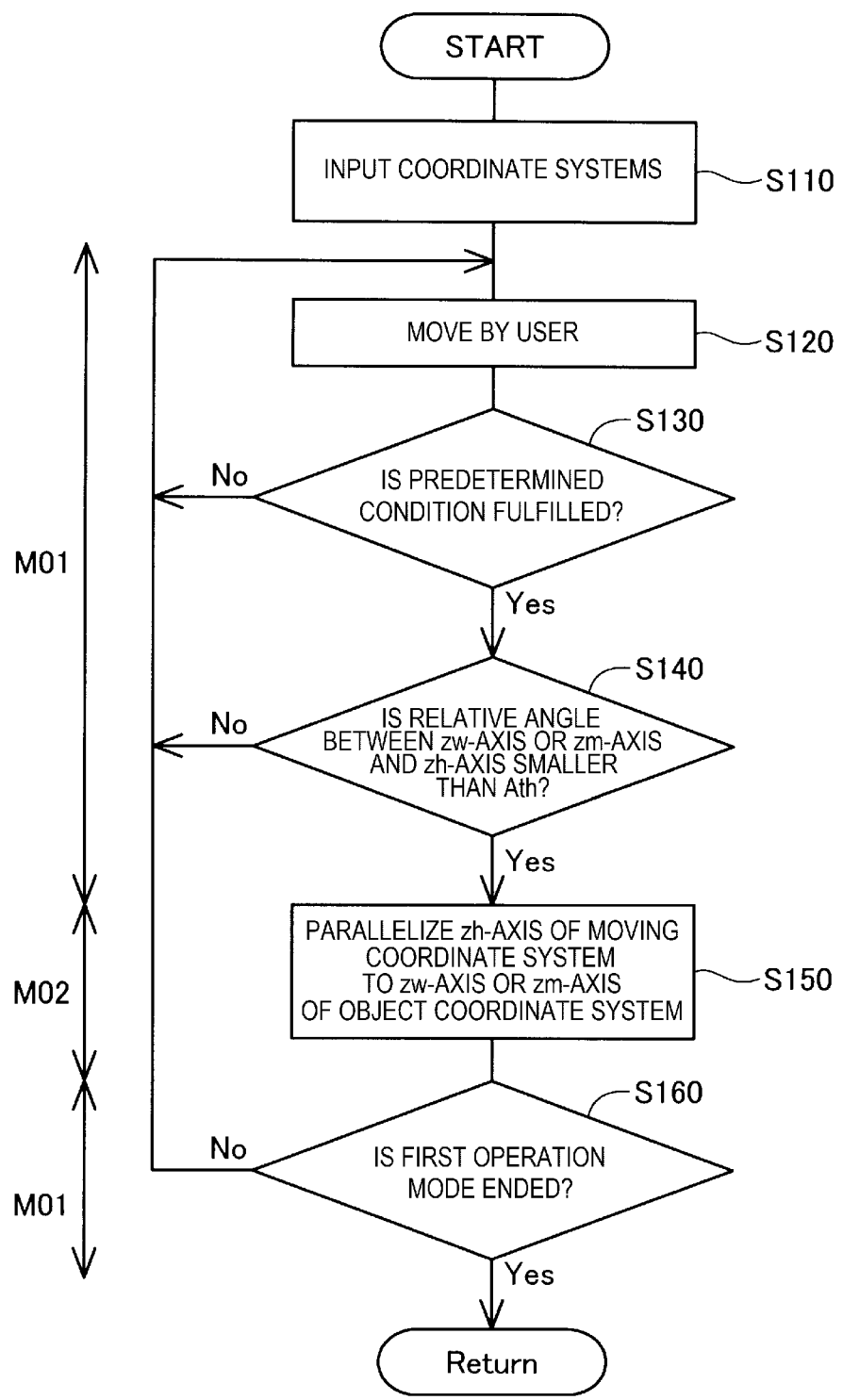
FIG. 4 is a flowchart showing details of processing in a first control mode.

FIG. 4 is the flowchart showing details of processing in the first control mode M01. At step S110, prior to execution of the first control mode M01, first, coordinate systems are input to the teaching apparatus 50 via the input device 57 and the robot 20.

Figure 5:
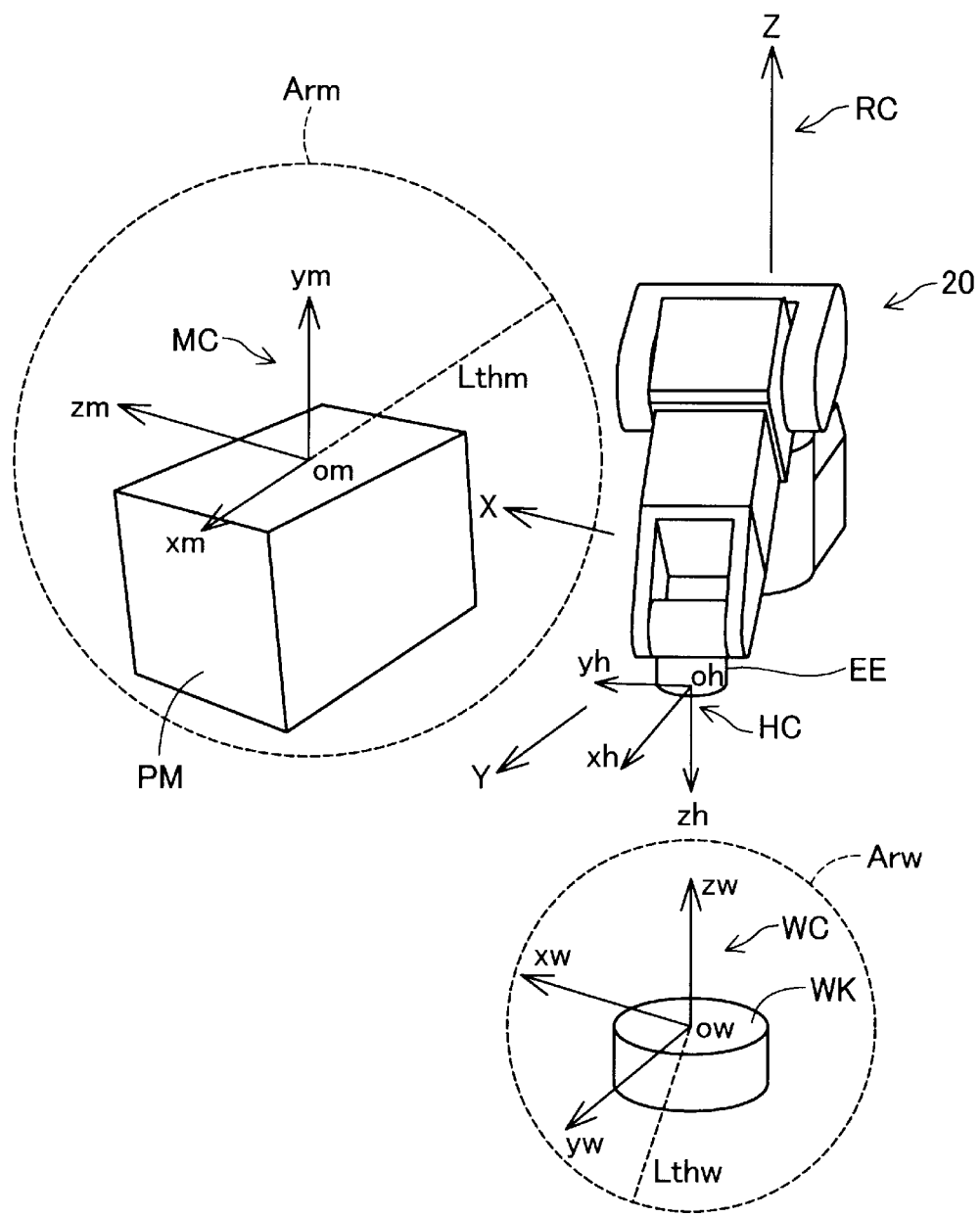
FIG. 5 shows an apparatus coordinate system, a work coordinate system, a robot coordinate system, and a moving coordinate system.
Figure 6:
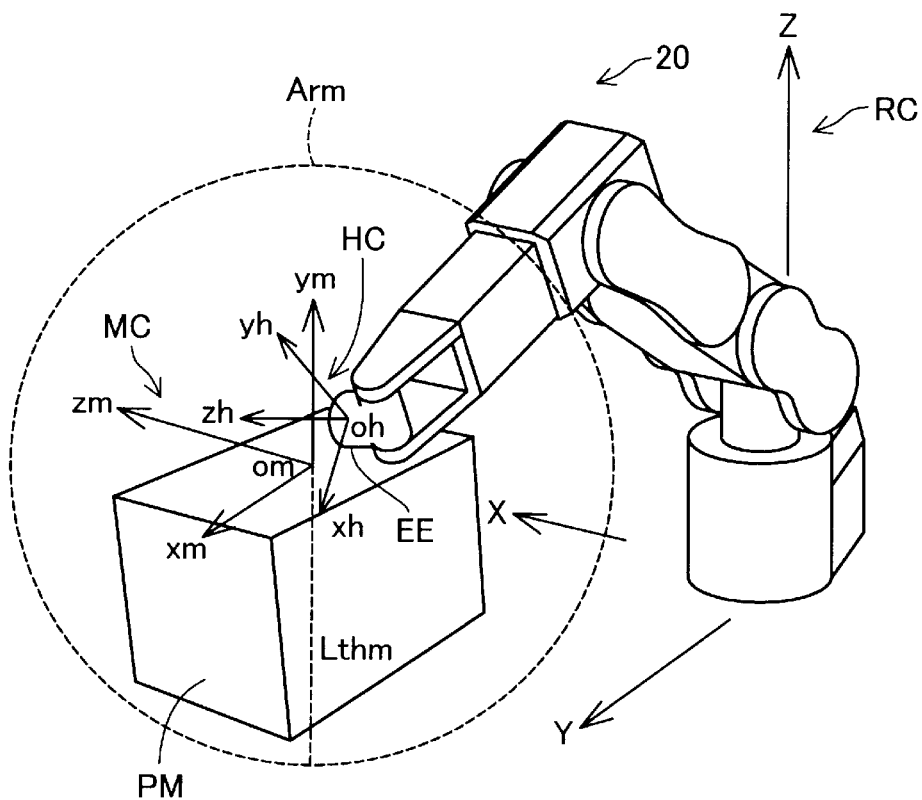
FIG. 6 shows the apparatus coordinate system, the work coordinate system, the robot coordinate system, and the moving coordinate system.
Figure 6:
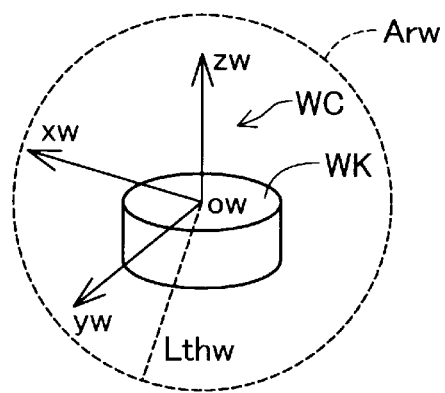

FIGS. 5 and 6 show the apparatus coordinate system MC, the work coordinate system WC, the robot coordinate system RC, and the moving coordinate system HC. The apparatus coordinate system MC is a coordinate system set for the processing apparatus PM. The work coordinate system WC is a coordinate system set for the work WK. The robot coordinate system RC is a coordinate system set for the support Bs of the robot 20. The moving coordinate system HC is a coordinate system set for the end effector EE and moves and rotates with the end effector EE.

Three axes orthogonal to one another defining the robot coordinate system RC are the X-axis, the Y-axis, and the Z-axis. Three axes orthogonal to one another defining the apparatus coordinate system MC are expressed by an xm-axis, a ym-axis, and a zm-axis. Three axes orthogonal to one another defining the work coordinate system WC are expressed by an xw-axis, a yw-axis, and a zw-axis. Three axes orthogonal to one another defining the moving coordinate system HC are expressed by an xh-axis, a yh-axis, and a zh-axis. The origin of the apparatus coordinate system MC is expressed by om. The origin of the work coordinate system WC is expressed by ow. The origin of the moving coordinate system HC is expressed by oh. In the embodiment, the origin oh of the moving coordinate system HC is equal to the TCP.

In the embodiment, at step S110 in FIG. 4, the apparatus coordinate system MC set for the processing apparatus PM and the work coordinate system WC set for the work WK are input to the teaching apparatus 50. The apparatus coordinate system MC and the work coordinate system WC may be collectively referred to as "object coordinate system".

The coordinate system may be set using the data of the coordinate system prepared within the teaching apparatus 50 as it is or by the user altering the data via the input device 57. For example, information of the apparatus coordinate system MC set for the processing apparatus PM may be stored within the RAM 50b as apparatus coordinate system information Im in advance when the robot system 1 is installed with the apparatus coordinate system MC in a factory. The apparatus coordinate system information Im is shown in FIG. 2.

Similarly, information of the work coordinate system WC set for the work WK may be stored within the RAM 50b as work coordinate system information Iw in advance when work to be executed by the robot system 1 is designated in the teaching apparatus 50. The work coordinate system information Iw is shown in FIG. 2.

The coordinate system may be set via the arm Am of the robot 20. For example, the distal end of the end effector EE is sequentially placed at three points on a plane of the work WK shown in FIG. 1, and positions of those three points within the three-dimensional space are taught to the teaching apparatus 50. The CPU 50a of the teaching apparatus 50 determines two directions perpendicular to the plane defined by the three points and opposite to each other. The user designates one direction of the two directions as a positive direction along the zw-axis via the input device 57. Then, for example, the user inputs the direction of the xw-axis via the input device 57, and further designates a left-handed system or right-handed system via the input device 57. In the embodiment, all of the apparatus coordinate system MC, the work coordinate system WC, the robot coordinate system RC, and the moving coordinate system HC are the right-handed systems. Then, the user determines the position of the origin ow via the input device 57.

By the above described processing, the work coordinate system WC may be input to the teaching apparatus 50. The apparatus coordinate system MC may be input to the teaching apparatus 50 in the same manner. The functional unit of the CPU 50a of the teaching apparatus 50 that realizes the function of step S110 is shown as a receiving unit 53 in FIG. 2.

At step S120 in FIG. 4, the user moves the end effector EE with the hand and places the end effector EE in the desired position at the desired angle within the three-dimensional space. The functional unit of the CPU 50a of the teaching apparatus 50 that realizes the function of step S120 is shown as an operation control unit 54 in FIG. 2.

At step S130, the teaching apparatus 50 determines whether or not a predetermined condition is fulfilled. In the embodiment, the predetermined condition is (i) the origin oh of the moving coordinate system HC, i.e., the TCP is in a position within a distance threshold value Lthm from the origin om of the apparatus coordinate system MC or (ii) the origin oh of the moving coordinate system HC, i.e., the TCP is in a position within a distance threshold value Lthw from the origin ow of the work coordinate system WC. In FIGS. 5 and 6, a range within the distance threshold value Lthm from the origin om is shown by Arm. A range within the distance threshold value Lthw from the origin ow is shown by Arw.

The distance threshold values Lthm, Lthw may be set independently of each other by the user via the input device 57. According to the configuration, unlike a configuration in which distance threshold values are fixed values, the user may set a condition under which the second control mode M02 is executed as desired. In the embodiment, the distance threshold values Lthm, Lthw may be set to values from 0 to 50 mm.

At step S130 in FIG. 4, when the predetermined condition is fulfilled, the processing moves to step S140. When the predetermined condition is not fulfilled, the processing returns to step S120.

Step S130 is provided, and thereby, in the control in the first control mode M01, when the distance between the origin oh of the moving coordinate system HC and the origin ow of the apparatus coordinate system MC is larger than the distance threshold value Lthm, the control in the second control mode M02 is not executed. Or, in the control in the first control mode M01, when the distance between the origin oh of the moving coordinate system HC and the origin ow of the work coordinate system WC is larger than the distance threshold value Lthw, the control in the second control mode M02 is not executed.

As a result, when the end effector EE is in a position farther from the work WK or the processing apparatus PM and a probability of a situation that it is necessary to accurately designate the posture of the end effector EE relative to the work WK or the processing apparatus PM is lower, the robot 20 may be allowed to execute control not in the second control mode M02. On the other hand, when the end effector EE is in a position closer to the work WK or the processing apparatus PM and the probability of the situation that it is necessary to accurately designate the posture of the end effector EE relative to the work WK or the processing apparatus PM is higher, the robot 20 may be allowed to execute control in the second control mode M02 through step S140.

At step S140, the teaching apparatus 50 determines whether or not a relative angle θho between the zm-axis of the apparatus coordinate system MC or zw-axis of the work coordinate system WC and the zh-axis of the moving coordinate system HC is smaller than the angle threshold value Ath. Note that, when an angle θ formed by the zm-axis of the apparatus coordinate system MC or zw-axis of the work coordinate system WC and the zh-axis of the moving coordinate system HC is equal to or larger than 90 degrees, in the processing at step S140, an angle of (180−θ) is used as the relative angle θho between the zm-axis of the apparatus coordinate system MC or zw-axis of the work coordinate system WC and the zh-axis of the moving coordinate system HC. When the angle θ formed by the zm-axis or zw-axis and the zh-axis is smaller than 90 degrees, in the processing at step S140, θ is used as the relative angle θho between the zm-axis or zw-axis and the zh-axis.

The angle threshold value Ath may be set by the user in advance via the input device 57. According to the configuration, unlike a configuration in which the angle threshold value is a fixed value, the user may set a condition under which the second control mode M02 is executed as desired.

In the embodiment, the angle threshold value Ath is 45 degrees. In a configuration in which the angle threshold value Ath is set to be a larger value than 45 degrees, even when the relative angle θho is smaller than the angle threshold value Ath, the direction of the zh-axis of the moving coordinate system HC may be closer to the xw-axis or yw-axis than to the zw-axis of the work coordinate system WC. When the direction of the zh-axis of the moving coordinate system HC is that direction, the user may not desire parallelization of the direction of the zh-axis of the moving coordinate system HC to the zw-axis of the work coordinate system WC. However, in the embodiment, the angle threshold value Ath is 45 degrees. Accordingly, compared to the case where the angle threshold value is larger than 45 degrees, the probability of execution of the second control mode M02 without the intention of the user may be reduced.

At step S140, when the relative angle θho is not smaller than the angle threshold value Ath, the processing returns to step S120. By the processing, when an estimation that the user does not intend to align the direction of the end effector EE with the direction of the work WK is made, performance of the processing at step S150 may be prevented.

At step S140, when the relative angle θho is smaller than the angle threshold value Ath, the processing moves to step S150.

At step S150, the teaching apparatus 50 controls the posture of the end effector EE to parallelize the zm-axis of the apparatus coordinate system MC or zw-axis of the work coordinate system WC, which has the relative angle θho to the zh-axis of the moving coordinate system HC smaller than the angle threshold value Ath, and the zh-axis of the moving coordinate system HC independent of the force detected by the force detection unit 21.

In the teaching of the robot, it is not easy to accurately align the direction of the fingers of the robot with a desired direction. Further, it is not easy for a person unskilled in teaching of the robot to set the direction of the coordinate system moving with the fingers of the robot according to the direction of the object. However, by the processing at step S150, the user may easily align the direction of the end effector EE with the desired direction. For example, the zw-axis of the work coordinate system WC is designated as the direction in which the end effector EE holds the work WK, and thereby, in teaching of work of holding the work WK using the end effector EE, the user may easily align the direction of the end effector EE with the desired direction. Further, for example, the zm-axis of the apparatus coordinate system MC is designated as a direction in which the work WK held by the end effector EE is carried into the processing apparatus PM, and thereby, in teaching of work of carrying the work WK into the processing apparatus PM using the end effector EE, the user may easily align the direction of the end effector EE with the desired direction.

The control executed at step S150 is the control in the second control mode M02. The control executed at steps S120 to S140, S160 is the control in the first control mode M01. The functional unit of the CPU 50a of the teaching apparatus 50 that realizes the function of step S150 is the operation control unit 54.

At step S160, the teaching apparatus 50 determines whether or not an instruction to end the first operation mode is input via the input device 57. At step S160, when a determination that the instruction to end the first operation mode is input is made, the processing ends. When a determination that the instruction to end the first operation mode is not input is made, the processing returns to step S120. Then, for example, the user may adjust the position and the posture of the end effector EE by moving the end effector EE along the zw-axis of the work coordinate system WC and rotating the end effector EE around the zw-axis.

Figure 7:
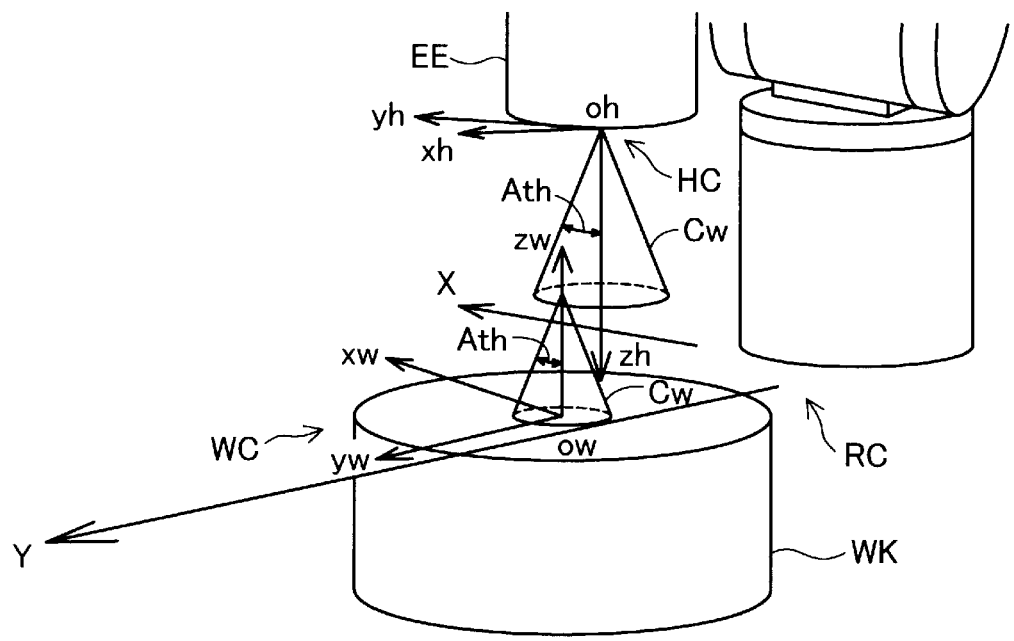
FIG. 7 is a conceptual diagram showing details of processing for determination as to whether or not a relative angle between a zh-axis of the moving coordinate system and a zw-axis of the work coordinate system is smaller than an angle threshold value at step S140 in FIG. 4.

A3. Magnitude Determination of Angle Formed by Axis of Moving Coordinate System and Axis of Object Coordinate System and Angle Threshold Value:

FIG. 7 is the conceptual diagram showing details of processing for determination as to whether or not the relative angle θhw between the zh-axis of the moving coordinate system HC and the zw-axis of the work coordinate system WC is smaller than the angle threshold value Ath at step S140 in FIG. 4. A cone Cw having a center axis along the zw-axis of the work coordinate system WC and an angle formed by the center axis and a side surface, i.e., an angle formed by the center axis and a generating line at Ath is set. The cone Cw is moved without rotation to a position in which the tip of the cone Cw coincides with the origin oh of the moving coordinate system HC. In this regard, when the zh-axis of the moving coordinate system HC is within a range surrounded by the side surface of the cone Cw, the relative angle θhw between the zh-axis of the moving coordinate system HC and the zw-axis of the work coordinate system WC is smaller than the angle threshold value Ath. On the other hand, when the zh-axis of the moving coordinate system HC is not within the range surrounded by the side surface of the cone Cw, the relative angle θhw between the zh-axis of the moving coordinate system HC and the zw-axis of the work coordinate system WC is larger than the angle threshold value Ath.

As more specific processing at step S140, the following processing may be employed. In the robot coordinate system RC, a unit vector Vzh in the zh-axis direction and a unit vector Vzw in the zw-axis direction are set. The relative angle θhw between the zh-axis of the moving coordinate system HC and the zw-axis of the work coordinate system WC may be obtained by the following expression (1)

$$\theta hw = \arccos(Vzh \cdot VZw) \tag{1}$$

When the relative angle θhw is smaller than Ath, the determination result at step S140 in FIG. 4 is Yes. A relative angle θhm between the zh-axis of the moving coordinate system HC and the zm-axis of the apparatus coordinate system MC may be obtained by the same processing. In this specification, the relative angle θhw between the zh-axis of the moving coordinate system HC and the zw-axis of the work coordinate system WC and the relative angle θhm between the zh-axis of the moving coordinate system HC and the zm-axis of the apparatus coordinate system MC are collectively referred to as "relative angle θho".

The end effector EE in the embodiment is also referred to as "movable unit". The work WK and the processing apparatus PM are also referred to as "objects". The operation control unit 54 is also referred to as "control unit". The zh-axis of the moving coordinate system HC is also referred to as "first axis". The zm-axis of the apparatus coordinate system MC and the zw-axis of the work coordinate system WC are also referred to as "second axes".

B. Second Embodiment

In the second embodiment, the details of the condition determined at step S130 in FIG. 4 are different from those of the first embodiment. The rest of the second embodiment is the same as that of the first embodiment.

In the first embodiment, the condition determined at step S130 is (i) the origin oh of the moving coordinate system HC is in a position within the distance threshold value Lthm from the origin om of the apparatus coordinate system MC or (ii) the origin oh of the moving coordinate system HC, i.e., the TCP is in a position within the distance threshold value Lthw from the origin ow of the work coordinate system WC. On the other hand, in the second embodiment, the condition determined at step S130 further includes (iii) an instruction to execute the second control mode M02 is input to the teaching apparatus 50 in advance via the input device 57. The functional unit of the CPU 50a of the teaching apparatus 50 that receives the instruction to execute the second control mode M02 is the receiving unit 53.

In the second embodiment, when the condition (i) and the condition (iii) are fulfilled or the condition (ii) and the condition (iii) are fulfilled, the determination result at step S130 in FIG. 4 is Yes. That is, when the instruction to execute the second control mode M02 is not input, the processing at step S150, i.e., the second control mode M02 is not executed.

According to the second embodiment, without desire, the user may prevent execution of the control in the second control mode M02 by the teaching apparatus 50 by not inputting the instruction to execute the second control mode M02 to the teaching apparatus 50.

C. Third Embodiment

In the third embodiment, the coordinate systems input at step S110 in FIG. 4 are different from those of the first embodiment. The rest of the second embodiment is the same as that of the first embodiment.

In the first embodiment, the coordinate systems input at step S110 are the apparatus coordinate system MC set for the processing apparatus PM and the work coordinate system WC set for the work WK. On the other hand, in the third embodiment, at step S110, the moving coordinate system HC set for the end effector EE and moving and rotating with the end effector EE is further input.

The moving coordinate system HC has the zh-axis along a direction in which the link L6 extends and the xh-axis and the yh-axis as two axes orthogonal to the zh-axis. For example, the user may input the moving coordinate system HC to the teaching apparatus 50 by the following processing. The user inputs the direction of the xh-axis via the input device 57, and further designates the left-handed system or right-handed system via the input device 57. Then, the user designates the position of the origin oh via the input device 57. By the above described processing, the moving coordinate system HC may be input to the teaching apparatus 50. The functional unit of the CPU 50a of the teaching apparatus 50 that realizes the function is the receiving unit 53.

According to the third embodiment, the user may set the moving coordinate system HC according to the details of work to be performed by the robot 20 and the configuration of the end effector EE to be replaced according to the work to be performed by the robot 20.

D. Fourth Embodiment

In the above described embodiments, at step S150 in FIG. 4, the following processing is performed. That is, the teaching apparatus 50 controls the posture of the end effector EE to parallelize the zm-axis of the apparatus coordinate system MC or zw-axis of the work coordinate system WC, which has the relative angle θho to the zh-axis of the moving coordinate system HC smaller than the angle threshold value Ath, and the zh-axis of the moving coordinate system HC independent of the force detected by the force detection unit 21. However, when a force equal to or larger than a predetermined force threshold value or torque equal to or larger than a predetermined torque threshold value is detected by the force detection unit 21, control of allowing the robot 20 to perform a different action from that when the force is not detected may be performed. The fourth embodiment is different from the first embodiment in the processing at step S150. The rest of the fourth embodiment is the same as that of the first embodiment.

Figure 8:
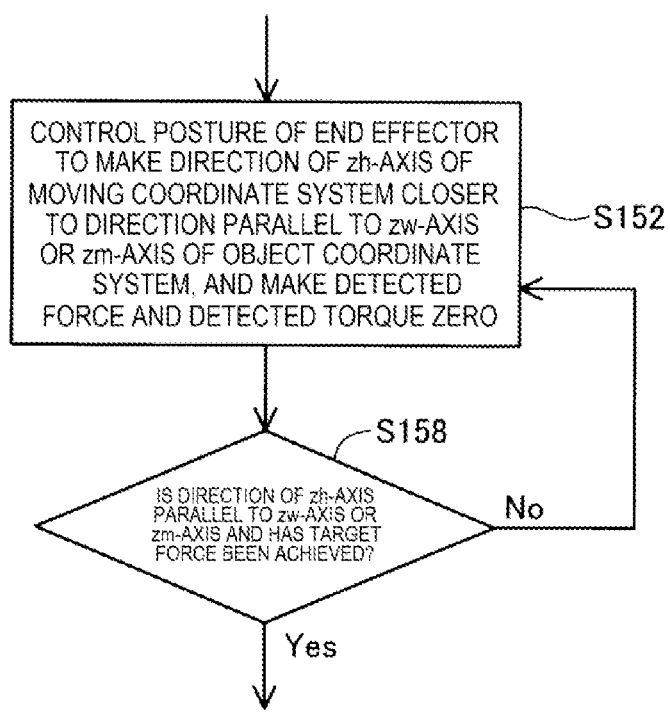
FIG. 8 is a flowchart showing processing performed in place of step S150 when a determination result at step S140 is Yes in a fourth embodiment.

FIG. 8 is the flowchart showing processing performed in place of step S150 when the determination result at step S140 in FIG. 4 is Yes in the fourth embodiment. At step S152, the teaching apparatus 50 controls the posture of the end effector EE to parallelize the zm-axis of the apparatus coordinate system MC or zw-axis of the work coordinate system WC, which has the relative angle θho to the zh-axis of the moving coordinate system HC smaller than the angle threshold value Ath, and the zh-axis of the moving coordinate system HC. In this regard, the teaching apparatus 50 concurrently controls the arm Am of the robot 20 to make both the force and the torque detected by the force detection unit 21 zero. That is, force control with the target force as zero and the target torque as zero is performed. The operation of the end effector EE achieved as a result of the control is referred to as "profile operation".

In the processing at step S152, both the force and the torque detected by the force detection unit 21 are zero unless the end effector EE of the robot 20 contacts any other configuration. However, at step S152, when the end effector EE of the robot 20 contacts the other configuration while the posture of the end effector EE is controlled to parallelize the zm-axis of the apparatus coordinate system MC or zw-axis of the work coordinate system WC and the zh-axis of the moving coordinate system HC, the force detection unit 21 detects a force and torque. In this case, the teaching apparatus 50 gives commands different from commands of rotation to the respective previously driven motors of the arm Am to the respective motors of the arm Am, and controls the posture of the end effector EE with both the force and the torque detected by the force detection unit 21 kept at zero.

At step S158, the teaching apparatus 50 determines whether or not both the force and the torque detected by the force detection unit 21 are zero and the zm-axis of the apparatus coordinate system MC or zw-axis of the work coordinate system WC, which has the relative angle θho to the zh-axis of the moving coordinate system HC smaller than the angle threshold value Ath, and the zh-axis of the moving coordinate system HC are parallel. The former determination is a determination as to whether or not the target force as zero and the target torque as zero are achieved. The latter determination is a determination, more specifically, that the teaching apparatus 50 determines whether or not the magnitude of the relative angle θho between the zm-axis of the apparatus coordinate system MC or zw-axis of the work coordinate system WC and the zh-axis of the moving coordinate system HC is equal to or smaller than a predetermined end threshold value angle Athe (0<Athe<Ath). The end threshold value angle Athe is set to be sufficiently small to such a degree that the zm-axis of the apparatus coordinate system MC or zw-axis of the work coordinate system WC and the zh-axis of the moving coordinate system HC is regarded as being parallel in the work being taught.

When the target force as zero and the target torque as zero are achieved and the magnitude of the relative angle θho is equal to or smaller than the end threshold value angle Athe, the processing moves to step S160 in FIG. 4. When not, the processing returns to step S152.

According to the configuration, when the processing apparatus PM and the work WK shown in FIG. 1 or the user contacts the end effector EE, the posture of the end effector EE may be controlled to parallelize the zm-axis of the apparatus coordinate system MC or zw-axis of the work coordinate system WC and the zh-axis of the moving coordinate system HC without damage on the processing apparatus PM and the work WK or hurt to the user. Further, compared to a control configuration in which the robot 20 stops when contacting the other configuration to ensure safety, the robot 20 may be efficiently taught.

Furthermore, the control of the embodiment is performed when work of inserting a second work into a hole having a predetermined depth provided in a first work is taught to the robot, and thereby, the following advantages are obtained. That is, the end effector EE may be automatically allowed to take a position and a posture in which the second object may be smoothly inserted into the hole provided in the first object as a result of controlling both the force and the torque detected by the force detection unit 21 to be zero and the posture of the end effector EE. Accordingly, the work of inserting the second work into the hole provided in the first work may be easily taught to the robot 20.

Figure 9:
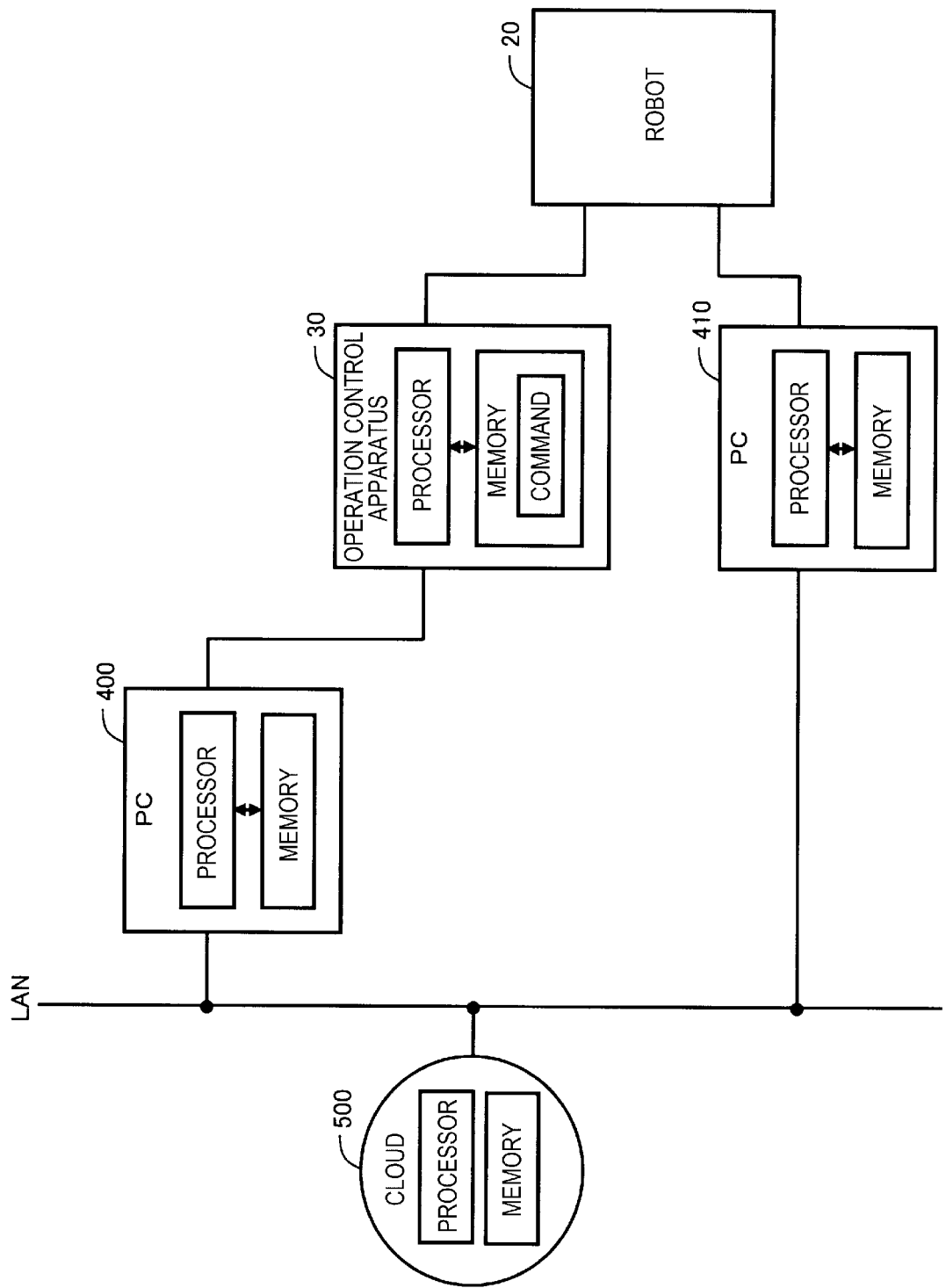
FIG. 9 is a conceptual diagram showing an example of a configuration of a control apparatus of a robot including a plurality of processors.

E. Fifth Embodiment (1) FIG. 9 is the conceptual diagram showing the example of the configuration of the control apparatus of the robot including the plurality of processors. In the example, in addition to the robot 20 and the operation control apparatus 30, personal computers 400, 410 and a cloud service 500 provided via a network environment such as LAN are illustrated. Each of the personal computers 400, 410 includes a processor and a memory. Further, a processor and a memory are available in the cloud service 500. The processor executes a command that can be executed by the computer. The robot control apparatus 25 including the operation control apparatus 30 and the teaching apparatus 50 can be realized using part or all of the plurality of processors. Further, a memory unit that stores various kinds of information can be realized using part or all of the plurality of memories.

Figure 10:
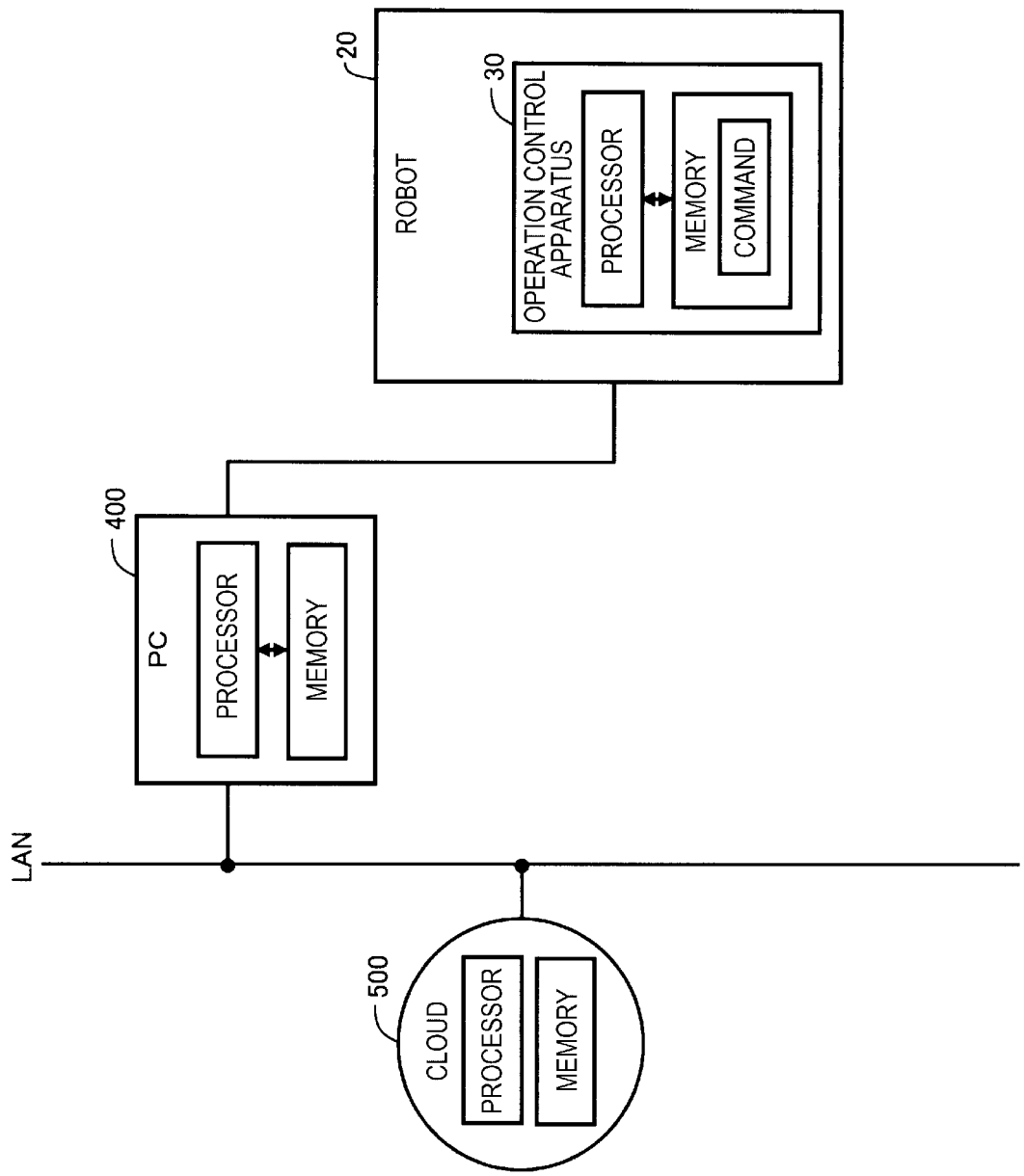
FIG. 10 is a conceptual diagram showing another example of the configuration of the control apparatus of the robot including a plurality of processors.

(2) FIG. 10 is the conceptual diagram showing another example of the configuration of the control apparatus of the robot including a plurality of processors. The example is different from that in FIG. 9 in that the operation control apparatus 30 of the robot 20 is housed in the robot 20. Also, in this example, the robot control apparatus 25 including the operation control apparatus 30 and the teaching apparatus 50 can be realized using part or all of the plurality of processors. Further, a memory unit that stores various kinds of information can be realized using part or all of the plurality of memories.

F. Other Embodiments

F1. Other Embodiment 1

(1) In the above described embodiments, as the force detection unit 21, a six-axis force sensor that may detect six components of force components in translational three axis directions and moment components about rotational three axes at the same time is attached to the distal end of the arm Am. However, the force detection unit may be e.g. a three-axis sensor that detects magnitude of forces on three detection axes orthogonal to one another. Or, the force detection unit may be an inertial measurement unit (IMU) that may detect angles or angular velocities and accelerations of the orthogonal three axes using gyroscopes for orthogonal three axes and accelerometers in three directions. Or, the force detection unit may be formed using a toque sensor provided in the joint. Or, the force detection unit may be formed as a device that measures a current of the motor provided in the joint and calculates torque from the current value.

The force detection unit may be provided in another part of the robot than the distal end of the arm Am e.g. between the support Bs and the link L1. Further, the function of the force detection unit may be realized by calculation of forces in three axis directions and torque about three axes at the TCP from torque of the motors provided in the respective joints of the robot.

(2) In the above described embodiments, the object coordinate system is set for the work WK and the processing apparatus PM. However, the object coordinate system may be fixed relative to a table on which the work WK is placed or one point contained in a carrying unit such as a belt conveyer that carries the work WK. Note that, in this specification, when "the object coordinate system is fixed relative to A", a relative position and a relative posture of the object coordinate system may be fixed relative to A. Further, "the object coordinate system is fixed relative to A" does not necessarily mean that the origin of the object coordinate system is at the surface or inside of A. That is, the origin of the object coordinate system may be in a position apart from A.

(3) In the above described embodiments, the direction perpendicular to the plane of the work WK is set as the zw-axis of the work coordinate system WC as the object coordinate system. However, the axis of the object coordinate system may be set with reference to another direction. For example, the upward gravity direction may be set as the z-axis of the object coordinate system.

(4) In the above described embodiments, the other condition is determined at step S130 prior to the determination at step S140 on the relative angle. However, the determination of the other condition may be made after the determination on the relative angle. The determination of the other condition may be made before and after the determination at step S140 on the relative angle.

For example, the processing at step S130 may be performed not before step S140, but after step S140. Further, whether or not the instruction to execute the second control mode M02 is input to the teaching apparatus 50 via the input device 57 may be determined after the determination at step S140 on the relative angle. In the configuration, when the instruction to execute the second control mode M02 is not input, the processing may return to step S120, and, when the instruction to execute the second control mode M02 is input, the processing may move to step S150.

(5) In the above described embodiments, when the angle θ formed by the zm-axis of the apparatus coordinate system MC or zw-axis of the work coordinate system WC and the zh-axis of the moving coordinate system HC is equal to or larger than 90 degrees, in the processing at step S140, the angle of (180−θ) is used as the relative angle θho between the zm-axis of the apparatus coordinate system MC or zw-axis of the work coordinate system WC and the zh-axis of the moving coordinate system HC. However, the processing is not performed, but the processing at step S140 may be performed using an angle formed by the first axis of the moving coordinate system and the second axis of the object coordinate system as it is as a relative angle of the axes.

(6) In the above described embodiments, at step S150 in FIG. 4, the posture of the end effector EE is controlled to parallelize the zh-axis of the moving coordinate system HC to the zw-axis of the work coordinate system WC or zm-axis of the apparatus coordinate system MC. However, of the three axes defining the moving coordinate system, the first axis as an object to be aligned with the other axis may be the xh-axis or yh-axis. Further, of the three axes defining the object coordinate system, the second axis as an object with which the first axis is to be aligned may be the other axis such as the xm-axis, ym-axis, xw-axis, or ym-axis.

(7) In the above described embodiments, at step S150 in FIG. 4, the posture of the end effector EE is controlled to parallelize the zh-axis of the moving coordinate system HC to the zw-axis of the work coordinate system WC or zm-axis of the apparatus coordinate system MC. However, regarding the movable unit, the posture of the end effector EE is not necessarily controlled to exactly parallelize the zh-axis of the moving coordinate system HC to the zw-axis of the work coordinate system WC or zm-axis of the apparatus coordinate system MC. That is, the posture of the movable unit may be controlled to make the magnitude of the relative angle between the first axis of the moving coordinate system and the second axis of the object coordinate system closer to zero, that is, to make the magnitude of the relative angle smaller.

F2. Other Embodiment 2

(1) In the above described first embodiment, the coordinate systems input at step S110 are the apparatus coordinate system MC set for the processing apparatus PM and the work coordinate system WC set for the work WK. In the third embodiment, the moving coordinate system HC set for the end effector EE is input. However, one or more of these coordinate systems may not be input to the robot control apparatus 25 including the teaching apparatus 50. Note that at least one of the object coordinate systems of the apparatus coordinate system MC and the work coordinate system WC may be input to the robot control apparatus 25 as the control apparatus.

(2) Further, the axis of the moving coordinate system and the axis of the object coordinate system for which the end effector EE is controlled to parallelize the axes to each other may be received from the user. In the configuration, for example, the user may select any axis of the xh-axis, the yh-axis, and the zh-axis of the moving coordinate system HC as an axis to be placed in parallel to the axis of the object coordinate system and input the axis to the control apparatus. Or, for example, the user may select any axis of the xm-axis, the ym-axis, and the zm-axis of the apparatus coordinate system MC and the xw-axis, the yw-axis, and the zw-axis of the work coordinate system WC as an axis to which the axis of the moving coordinate system HC is to be placed in parallel, and input the axis to the control apparatus. Note that one or both of the two axes for which the end effector EE is controlled to parallelize the axes to each other may be set in advance, not input from the user.

F3. Other Embodiment 3

In the above described embodiments, the angle threshold value Ath is 45 degrees. However, the angle threshold value may be a value smaller than 45 degrees, e.g. 15 degrees or 30 degrees or a value equal to or larger than 45 degrees. Note that the angle threshold value Ath may be smaller than 30 degrees and more preferably smaller than 15 degrees.

F4. Other Embodiment 4

In the above described embodiments, the angle threshold value Ath is designated by the user via the input device 57. However, the angle threshold value may be a fixed value. Or, the angle threshold value Ath may be set to a different value with respect to each object of the processing apparatus and the work. Or, in the configuration in which the angle threshold value Ath is designated by the user, the upper limit of the angle threshold value Ath may be predetermined in advance. In the configuration, the upper limit of the angle threshold value Ath may be equal to or smaller than 45 degrees.

F5. Other Embodiment 5

In the first embodiment, the condition determined at step S130 is (i) the origin oh of the moving coordinate system HC is in a position within the distance threshold value Lthm from the origin om of the apparatus coordinate system MC or (ii) the origin oh of the moving coordinate system HC, i.e., the TCP is in a position within the distance threshold value Lthw from the origin ow of the work coordinate system WC. In the second embodiment, the condition determined at step S130 further includes (iii) the instruction to execute the second control mode M02 is input to the teaching apparatus 50 in advance via the input device 57.

However, the condition for determination as to whether or not the execution of the second control mode is allowed may further include another condition. For example, the condition for determination as to whether or not the execution of the second control mode is allowed may include a condition that the origin of the moving coordinate system is within a predetermined distance range from the outer edge of the work WK and a condition that the origin of the moving coordinate system is within a predetermined distance range from the outer edge of the processing apparatus PM. Or, in place of the origin of the moving coordinate system, the position of the distal end of the end effector may be used as a criterion for the determination of the above described respective conditions. Or, the condition may not include a subordinate condition of one of the above described conditions.

On the other hand, when the relative angle between the second axis of the object coordinate system and the first axis of the moving coordinate system is smaller than the angle threshold value, control in the second control mode may be constantly performed. That is, the predetermined condition may be a condition that is constantly fulfilled.

F6. Other Embodiment 6

(1) In the above described embodiments, the distance threshold values Lthw, Lthm are designated by the user via the input device 57. However, the distance threshold values may be fixed values determined according to objects. Or, the distance threshold values may be a single fixed value determined independent of objects. In those configurations, the distance threshold values may be from 0 to 40 mm and preferably from 0 to 30 mm.

F7. Other Embodiment 7

(1) In the first embodiment, the condition determined at step S130 is (i) the origin oh of the moving coordinate system HC is in a position within the distance threshold value Lthm from the origin om of the apparatus coordinate system MC or (ii) the origin oh of the moving coordinate system HC, i.e., the TCP is in a position within the distance threshold value Lthw from the origin ow of the work coordinate system WC. In the second embodiment, the condition determined at step S130 further includes (iii) the instruction to execute the second control mode M02 is input to the teaching apparatus 50 in advance via the input device 57.

However, one or more of these subordinate conditions may not be included in the determination condition at step S130. Note that at least one of the above described respective conditions may be included in the determination condition as to whether or not the execution of the second control mode is allowed.

Or, when the instruction as to whether or not to execute the second control mode M02 is not received from the user and a predetermined condition is fulfilled, the second control mode M02 may be automatically executed.

F8. Other Embodiment 8

(1) In the above described embodiments, the control in the third control mode M03 is executed after the control in the first control mode M01 is executed. However, the control in the third control mode M03 may not be executed. In the configuration, the control in the second control mode M02 is executed, and thereby, the direction of the end effector as the movable unit may be aligned with a desired direction. Note that the control in the third control mode M03 may be executed for appropriate control in reflections of deviation of actual shapes, dimensions, placements of the work, the processing apparatus, and the robot from design values.

(2) In the above described embodiments, the predetermined amount of movement in the third control mode M03 is 0.1 mm and the predetermined rotation angle is 0.5 degrees. However, the predetermined amount of movement in the third control mode M03 may be set to another value e.g. 0.05 mm, 0.3 mm, or 0.5 mm. Note that the predetermined amount of movement in the third control mode M03 may be smaller than 1 mm. Further, the predetermined rotation angle in the third control mode M03 may be set to another value e.g. 0.2 degrees, 1 degree, or 2 degrees. Note that the predetermined rotation angle in the third control mode M03 may be smaller than 1 degree.

G. Yet Other Embodiments

The present disclosure is not limited to the above described embodiments, but may be realized in various forms within the range without departing from the scope thereof. For example, the present disclosure can be realized in the following aspects. The technical features in the above described embodiments corresponding to the technical features in the following respective embodiments can be appropriately replaced or combined to solve part or all of the problems of the present disclosure or to achieve part or all of the effects of the present disclosure. Further, the technical features can be appropriately deleted unless the technical features are described as essential features in this specification.

(1) According to an aspect of the present disclosure, a control apparatus that controls a robot including a movable unit and a force detection unit detecting a force applied to the movable unit is provided. The control apparatus includes a control unit that executes control of the robot, and a receiving unit that receives an object coordinate system set for an object from a user. The control unit has a first control mode in which the movable unit is moved and rotated according to the force detected by the force detection unit while the force is detected by the force detection unit, and a second control mode in which, when a relative angle between a predetermined first axis of a moving coordinate system set for the movable unit and a predetermined second axis of the object coordinate system is smaller than an angle threshold value in the control in the first control mode, the movable unit is rotated to make magnitude of the relative angle closer to zero under a predetermined condition.

According to the configuration, the user may easily align the direction of the movable unit of the robot with a desired direction in the second control mode by setting the second axis of the object coordinate system to a desirable direction.

(2) In the above described aspect, the receiving unit may receive the first axis and the second axis from the user. According to the configuration, the user may set the first axis and the second axis according to details of work to be performed by the robot and the configuration of the movable unit.

(3) In the above described aspect, the angle threshold value may be larger than 0 and smaller than 45 degrees. According to the configuration, compared to the case where the angle threshold value is larger than 45 degrees, a probability of execution of the second control mode when not desired by the user may be reduced.

(4) In the above described aspect, the receiving unit may receive the angle threshold value from the user. According to the configuration, compared to the case where the angle threshold value is a fixed value, the user may set the condition under which the second control mode is executed as desired.

(5) In the above described aspect, the condition may include whether or not a distance between an origin of the moving coordinate system and an origin of the object coordinate system is larger than a distance threshold value in the control in the first control mode.

According to the configuration, the origin of the object coordinate system is set on an object of work or within the object of work, and thereby, when the movable unit of the robot is far from the object, the control unit may not be allowed to execute the control in the second control mode. As a result, when the movable unit of the robot is far from the object and a probability of a situation that it is necessary to accurately designate the posture of the movable unit relative to the object is lower, the robot may be allowed to execute control not in the second control mode. On the other hand, when the movable unit of the robot is in a position closer to the object and the probability of the situation that it is necessary to accurately designate the posture of the movable unit relative to the object is higher, the robot may be allowed to execute the control in the second control mode.

(6) In the above described aspect, the receiving unit may receive the distance threshold value from the user. According to the configuration, compared to the case where the distance threshold value is a fixed value, the user may set the condition under which the second control mode is executed as desired.

(7) In the above described aspect, the receiving unit may receive an instruction as to whether or not to execute the second control mode from the user, and the condition may include whether or not the instruction to execute the second control mode is input to the receiving unit. According to the configuration, the user may not allow the control unit to execute the control in the second control mode by not inputting the instruction to execute the second control mode to the receiving unit when not desired.

(8) In the above described aspect, the control unit may have a third control mode in which, when the force is detected by the force control unit, the movable unit is moved or rotated in a predetermined direction in a predetermined amount according to the direction of the detected force, and the second control mode may not be performed in control in the third control mode. According to the configuration, the user may use the second control mode and the third control mode differently depending on a purpose in teaching of the robot.

(9) According to another aspect of the present disclosure, a robot system including the robot control apparatus according to any one of the above described configurations, and the robot controlled by the robot control apparatus is provided.

The present disclosure can be realized in other various aspects. For example, the present disclosure may be realized in aspects of a robot, a control method for the robot, a computer program for realizing the control method, a non-transitory storage medium with the computer program recorded therein, etc.

Not all of the plurality of component elements of the respective aspects of the above described present disclosure are essential. To solve part or all of the above described problems or to achieve part or all of the effects described in this specification, part of the plurality of component elements can be appropriately changed, deleted, and replaced by new other component elements, and part of the limitations thereof can be deleted. Further, to solve part or all of the above described problems or to achieve part or all of the effects described in this specification, part or all of the technical features contained in the above described one aspect of the present disclosure may be combined with part or all of the technical features contained in the above described other aspect of the present disclosure, and thereby, one independent aspect of the present disclosure can be obtained.

What is claimed is:

1. A control apparatus that controls a robot including an end effector and a force detector detecting an external force applied to the end effector, comprising:
    a memory configured to store a program; and
    a processor configured to execute the program so as to:
        receive an object coordinate system via an input device operable by a user, the object coordinate system being set for an object, the object coordinate system having a first X-axis, a first Y-axis, and a first Z-axis;
        execute a direct teaching mode of the robot, in the direct teaching mode, the processor being further configured to:
            cause the end effector of the robot to move and rotate according to only a detection signal from the force detector corresponding to the external force applied to the end effector; and
            cause the end effector of the robot to maintain a stop position when the force sensor detects no external force applied to the end effector;
        determine a relative angle between one axis of the object coordinate system and one axis of an end effector coordinate system, the end effector coordinate system being set for the end effector, the end effector coordinate system having a second X-axis, a second Y-axis, and a second Z-axis; and
        execute an alignment mode of the robot when the processor determines that the relative angle is smaller than an angle threshold value, in the alignment mode, the processor being further configured to:
            rotate the end effector so as to make the relative angle to be zero, the rotation of the end effector being performed due to driving by the robot without using the detection signal from the force detector.

2. The control apparatus according to claim 1, wherein the processor is configured to receive the one axis of the object coordinate system and the one axis of an end effector coordinate system via the input device.

3. The control apparatus according to claim 1, wherein the angle threshold value is larger than 0 and smaller than 45 degrees.

4. The control apparatus according to claim 1, wherein the processor is configured to receive the angle threshold value via the input device.

5. The control apparatus according to claim 1, wherein in the alignment mode, when a distance between an origin of the end effector coordinate system and an origin of the object coordinate system is smaller than a distance threshold value in the control, the processor is configured to rotate the end effector to make the relative angle to be zero.

6. The control apparatus according to claim 5, wherein the processor is configured to receive the distance threshold value via the input device.

7. The control apparatus according to claim 1, wherein the processor is configured to:
    receive an instruction as to whether or not to execute the alignment mode via the input device; and
    execute the alignment mode when the processor receives the instruction to execute the alignment mode via the input device.

8. The control apparatus according to claim 1, wherein the processor is configured to execute a touch jog mode in which, when the force is detected by the force detector, the end effector is moved or rotated in a predetermined direction in a predetermined amount according to a direction of the detected force, and
the alignment mode is not executed when the touch jog mode is executed.

9. A robot system comprising:
    a robot including an end effector and a force detector detecting an external force applied to the end effector;
    a memory configured to store a program; and
    a processor configured to execute the program so as to:
        receive an object coordinate system via an input device operable by a user, the object coordinate system being set for an object, the object coordinate system having a first X-axis, a first Y-axis, and a first Z-axis;
        execute a direct teaching mode of the robot, in the direct teaching mode, the processor being further configured to:
            cause the end effector of the robot to move and rotate according to only a detection signal from the force detector corresponding to the external force applied to the end effector; and
            cause the end effector of the robot to maintain a stop position when the force sensor detects no external force applied to the end effector;
        determine a relative angle between one axis of the object coordinate system and one axis of an end effector coordinate system, the end effector coordinate system being set for the end effector, the end effector coordinate system having a second X-axis, a second Y-axis, and a second Z-axis; and execute an alignment mode of the robot when the processor determines that the relative angle is smaller than an angle threshold value, in the alignment mode, the processor being further configured to:

rotate the end effector so as to make the relative angle to be zero, the rotation of the end effector being performed due to driving by the robot without using the detection signal from the force detector.

* * * * *